United States Patent [19]
Kaelin

[11] 3,933,325
[45] Jan. 20, 1976

[54] DISC-SHAPED AEROSPACECRAFT

[76] Inventor: Joseph Richard Kaelin, Villa Seeburg, Buochs, Switzerland

[22] Filed: Sept. 24, 1974

[21] Appl. No.: 508,895

[30] Foreign Application Priority Data
Sept. 25, 1973 Switzerland............. 13750/73

[52] U.S. Cl. ............................ 244/23 C
[51] Int. Cl.² ........................... B64C 29/00
[58] Field of Search..... 244/12 B, 12 C, 23 B, 23 C, 244/52, 54, 55

[56] References Cited
UNITED STATES PATENTS

| | | | |
|---|---|---|---|
| 2,677,931 | 5/1954 | Prieto ........................... | 244/52 X |
| 2,743,885 | 5/1956 | Peterson ...................... | 244/12 C X |
| 2,930,546 | 3/1960 | Wibault ........................ | 244/23 B |
| 2,935,275 | 5/1960 | Grayson ....................... | 244/23 C |
| 3,072,366 | 1/1963 | Freeland ....................... | 244/23 C |
| 3,193,214 | 7/1965 | Hollingsworth ................. | 244/52 X |
| 3,335,976 | 8/1967 | Kappus .......................... | 244/23 B X |
| 3,514,053 | 5/1970 | McGuinness .................... | 244/12 C |

FOREIGN PATENTS OR APPLICATIONS

| | | | |
|---|---|---|---|
| 2,030,603 | 12/1971 | Germany ......................... | 244/23 C |
| 230,204 | 3/1963 | Austria ............................ | 244/23 C |

Primary Examiner—Trygve M. Blix
Assistant Examiner—Barry L. Kelmachter
Attorney, Agent, or Firm—Werner W. Kleeman

[57] ABSTRACT

An aerospacecraft possessing a discus shaped body equipped with at least one disc type air screw driven by a turbine by the exhaust gases of a jet engine. The disc type air screw is equipped with variable pitch blades and works in the manner of a helicopter rotor for the generation of lift.

2 Claims, 6 Drawing Figures

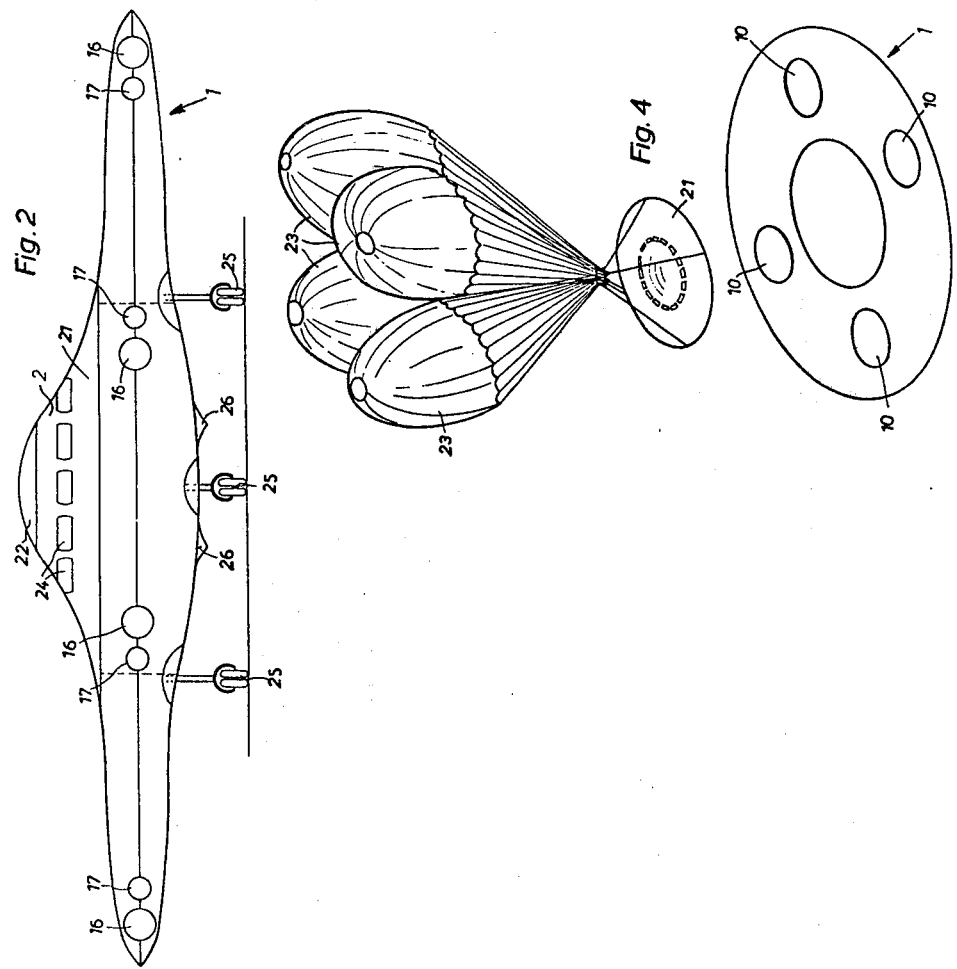

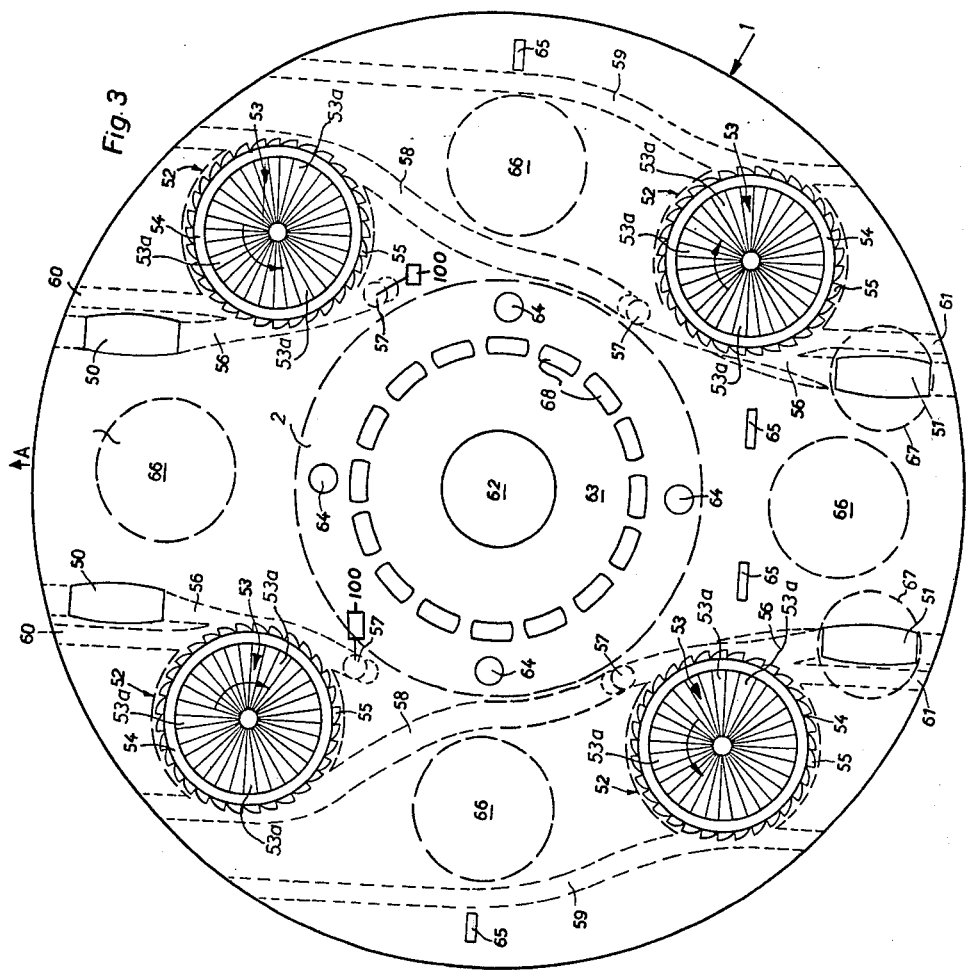

DISC-SHAPED AEROSPACECRAFT

The present invention concerns a new and improved construction of aerospacecraft. The aerospacecraft of this development is distinguished by its discus shaped formation. Also, that it possesses at least one disc type air screw which is driven by the off-gases or exhaust gases from a jet engine via a turbine. The disc type air screw is equipped with adjustable pitch blades and used like helicopter rotors for lift.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 2 is a frontal view of the craft shown in FIG. 1,

FIG. 3 is a plan view of a second example of an aerospacecraft

FIG. 4 is a general illustration of the craft with opened parachute and the cabin detached from the craft.

DETAILED DESCRIPTION OF THE INVENTION

Figure 1:
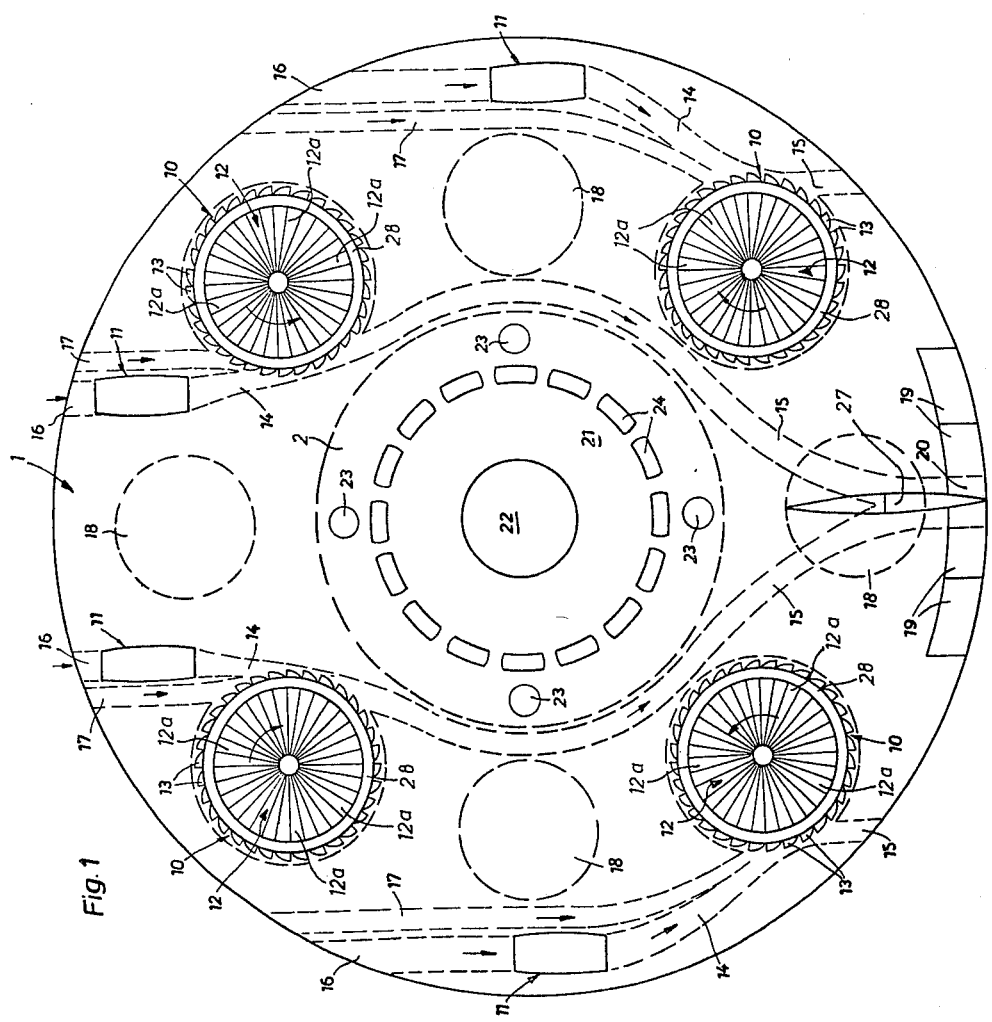
FIG. 1 is a plan view of a first example of an aerospacecraft.

As shown in FIG. 1 and 2, the craft is constituted by a round discus or disc type of body 1, which is centrally more convex on the upper side than on the under side in order to create lift during flight. Four gyroscopes 10 are installed in this body 1 and which are equally spaced along an imaginary circle. The body 1 is further equipped with four jet engines 11, two of which are diametrically opposed to each other along a diagonal near the periphery of body 1, whereas the other two engines are placed side by side and symmetrically to a diagonal which lies at 90° to the first mentioned diagonal. Conventional types of jet engines can be used for these four jet engines 11. The four gyroscopes 10 are fitted with disc type air screws 12 with several adjustable pitch blades 12a and also fitted with vanes 13, which are impinged by the off-gases or exhaust gases from the jet engines 11. To guide the exhaust gases onto the vanes 13 on the disc type air screws 12, ducts 14 are provided, through which the exhaust gases from the jet engines 11 are guided straight onto the vanes 13 of the disc air screws 12. Further ducts 15 are provided, which lead the exhaust gases after contact with the vanes 13 of the disc air screws 12 to the outside of the craft. For the intake of fresh air to the jet engines 11 the ducts 16 are provided. Furthermore, ducts 17 can direct fresh air immediately onto the vanes 13 of the disc type air screw 12. The fuel for the jet engines 11 is stored in four fuel tanks or storages 18 which are also placed on an imaginary circle between the gyroscopes 10. The fuel tanks 18 are emptied simultaneously, so that the trim of the craft is maintained. Four elevators 19 are provided for the steering of the craft, a trim foil 20 and a rudder with stabiliser 27.

In the centre of the craft there is provided a ring shaped cabin 21 which is intended for the passengers as well as a pilot cabin 22. The latter is placed centrally and above the passenger cabin 21. Both of these cabins 21 and 22 can be detached from the outer part of the aerospacecraft and are fitted with four parachutes 23 which are capable of carrying the detached cabins 21 and 22, as can be seen from FIG. 4. The passenger cabin 21 is provided with a number of windows 24.

An undercarriage 25 is installed for the landing of the craft. Steps (not shown) aid entry and exit from the cabins 21 and 22. There are further provided special hydraulically adjustable stabilisers 26 for landing on water and also for the stabilising of the craft during flight.

The four jet engines 11 can be rotated (not shown) so that the jet force of the engines 11 can work in two directions which are at 90° to each other. This makes it possible to use them for lift as well as for forward movement of the craft.

The four disc type air screws 12 are constructed in such a way that the individual air screw blades 12a can be adjusted by means of a planetary drive in conventional manner, for example by means of EDV controlled number of revolutions.

At the end of the blades 12a of the disc type air screw 12 there is provided a fly mass 28 which rotates with the disc type propeller. It serves to lend the necessary stability to the craft during flight as well as during take-off and landing.

The effectiveness of the described aerospacecraft is as follows:

Reacting onto the body 1 of the craft are firstly the thrust forces of the four jet engines 11, which by means of their rotatability can react in two directions at right angles to each other. Secondly, the more complex shape of the upper part of the body in contrast to the lower side creates a lifting force for the craft. Thirdly, the four gyroscopes 10 create a force which stabilises the craft in space, and fourthly the disc type air screws 12 lend further lift to the craft.

The combination of the four forces make it possible to take off with the craft in three different ways. Firstly, the four jet engines 11 can be positioned horizontally prior to take-off, so that the craft can take off similar to a conventional aircraft on a virtually horizontal plane. During this take-off the blades of the circular air screw 12a are positioned in such a way, that they give virtually no lift. Secondly, the craft can take off at an angle of 45°, in which for instance two jet engines 11 are positioned vertically, whereas the other two remain in a horizontal position. Together with this the two disc air screws 12 react with their blades 12a as lifting rotors. Take-off at an angle below 45° can also take place if all four jet engines 11 are positioned horizontally and if the pitch for the air screw blades 12a is adjusted accordingly. Thirdly, the craft can take off vertically, in which case all four jet engines are directed in such a way that they react vertically.

For vertical take-off, the exhaust gases of the jet engines 11 do not drive the blades 12a of the rotary air screw, so that these are operated purely by the air flowing through ducts 17. This drive, however, is sufficient to create the stabilising force of the rotors 12. Touch-down on land respectively air takes place in a similar manner.

As the arrows indicate in FIG. 1, two of the four gyroscopes 10 are revolving in a clock-wise direction, whereas the other gyroscopes 10 are revolving anti-clockwise. This effect is obtained firstly by the positioning of exhaust gas ducts 14 and otherwise by the shape of the turbo blades 13 on the disc type screw 12. For a stable position of the craft it is necessary that two of the four gyroscopes 10 work in opposite directions to the remaining two.

FIG. 3 shows a plan view of a second example of an aerospacecraft. Its outer shape is the same as that shown in FIG. 2.

In this second embodiment, each two jet engines 50 and 51 are symmetrically positioned on a diagonal across the craft and near the periphery of the body 1. Four gyroscopes 52 are provided which are equidistantly spaced along an imaginary circle, similar to the first embodiment. These gyroscopes 52 can either be combined, as in the first embodiment with disc-type air screw 53 with adjustable pitch blades, or they can be installed separately as a fly wheel gyroscope 54 next to the disc type air screws 53. The disc type air screw 53 is fitted on the periphery with turbine vanes 55, onto which the exhaust gases from jet engines 50 and 51 are ducted. Should the gyroscope 52 be installed as a separate entity next to the air screws 53, then they are driven by suitable gears (not shown on the drawing) from the air screws 53. FIG. 3 shows the manner in which the ring shaped fly wheel mass 54 is attached to the blade ends of air screw blades 53a. This fly wheel mass 54 offers the craft the necessary space stability, similar to the example of FIG. 1.

Behind the jet engines 50 and 51 there are installed the exhaust gas ducts 56 which direct the exhaust gases from jet engines 50 and 51 directly onto the turbo vanes 55. The exhaust gas ducts 56 merge with the exhaust pipes 57 behind the turbo vanes 55, which are inclined from the centre plane of the disc by 45°, so that the emerging gas stream is directed against the ground at approx. 45° and results in lift during take-off of the aircraft. The two rear jet engines 51 are each mounted on a turntable 67 and can be rotated through 180°, so that the thrust of all four jet engines 50 and 51 can work in parallel directions. Should the two rear jet engines 51 be positioned in such a way that their thrust reacts in the same direction as the thrust from the forward jet engines 50, then three-way valves, schematically indicated by reference character 100 in FIG. 3, close the exhaust pipes 57, belonging to jet engines 51, and instead the exhaust gas ducts 56 of the jet engines 51 are connected with the ducts 58, so that fresh air can flow through ducts 58 and the channels 56 to the jet engines 51. Pipes 59, 60 and 61 are provided for the cooling and the drive of the turbo vanes 55. By means of the pipes 59, additional cooling air flows into the aerospacecraft when moving, the quantity being dependent upon the speed of the craft, whereas fresh air is sucked and led to the turbo vanes 55 through the pipes 60 by means of the flow of exhaust gases of the forward engines. Fresh air is sucked and led to the turbo vanes 55 on the rear jet engine 51 by means of pipe 61.

In the centre of the body, and analogous to the first embodiment a cabin 63 for passengers and a second cabin 62 for the pilot are provided. The passenger cabin is fitted with a number of windows 68. Fitted to these cabins are four parachutes 64, which in case of danger can be separated from the outer part of the disc body and are capable of carrying the detached cabin. This can be seen in FIG. 4.

Steering of the aircraft is controlled by four withdrawable steering vanes. The fuel for the jet engines 50 and 51 is stored in four symmetrically arranged tanks 66 which are equally emptied during operation.

The effective working of the described aerospacecraft, similar to that described in example 1, is as follows:

For take-off the thrust of the two rear jet engines 51 is adjusted in an opposite direction to that of the forward jet engines 50. This drives the four disc type air screws 53 in the directions indicated by the arrows. The pitch of the air screw blades in the disc type air screw 53 is adjusted for take-off in such a way that the highest possible lift is created. By means of the four exhaust pipes 57, the exhaust gases of the jet engines 50 and 51 are directed against the ground, so that the thrust of the engines 50 and 51 is used for the lifting of the craft during vertical take-off.

As soon as the craft has obtained a certain height, the two rear jet engines 51 are revolved through 180° so that the thrust of all four jet engines 50 and 51 reacts in the same direction. Lift is then only being exerted by the two forward jet engines 50 by means of the exhaust pipes 57 and the resulting exhaust jet and the disc type air screws 53, which are driven by the exhaust gases from jet engines 50. During this time the rear jet engines 51 produce pure forward thrust, as their exhaust gases do not emerge via the exhaust pipes 57 nor the disc type rotors 53.

Touch-down on land or water of the craft takes place in a similar manner.

Alteration of the pitch of the air screw blades 12a respectively 53a alters the lift created by the rotary screws 12 or 53. The amount of this lift can therefore be adjusted by regulation of the number of revolutions of the air screw disc 12 and 53.

During any break-down, which could become dangerous for passengers and crew, as for instance fire, failure of control or engines, the cabins 21, 22 and 62 and 63 can be detached from the outer ring shaped part of the craft. This separation can be carried out by mechanical, hydraulic or electrical installations. The separated centre 2 of the craft with its cabins is lowered by means of the parachutes 24 respectively 64 in a manner which is not dangerous for either the passengers or crew. Near the ground, the cabins are braked by means of braking rockets, so that the touch-down on either land or water is as soft as possible.

Figure 5:
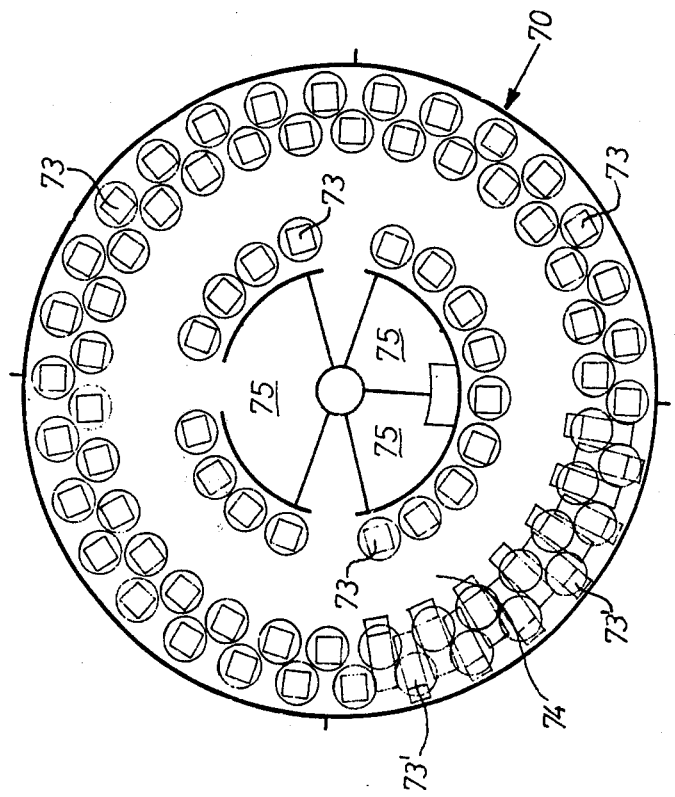
FIG. 5 is a plan view of the lower passenger space.
Figure 6:
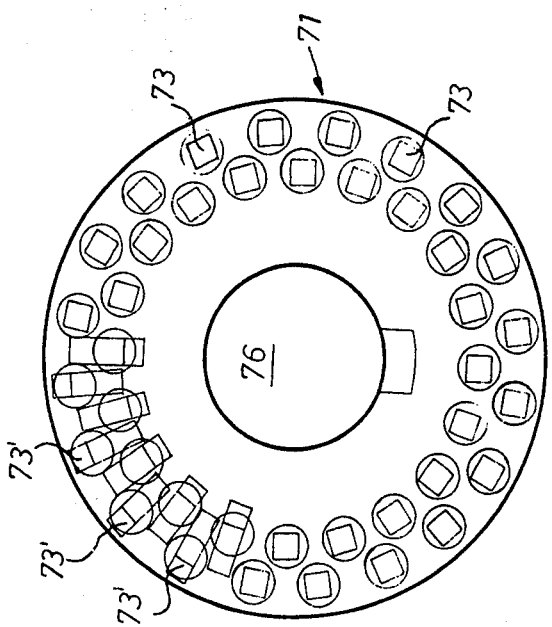
FIG. 6 is a plan view of the upper passenger room inside the cabin of the aerospacecraft.

FIG. 5 and 6 show a plan view of the lower respectively upper passenger area 70 respectively 71. In both passenger cabins 70 and 71 revolving seats 73 are arranged around the periphery of the circular room in two rows. In this arrangement one row is offset with respect to the other, so that the seats 73 in both rows can be transformed into couches.

In the lower passenger room 70 a further row of seats 73 is installed, which is separated by a passage 74. In the centre of the room 70 are rooms 75 which can be used for various purposes.

In the case of the upper passenger area 71, which is smaller than the lower passenger area 70, a pilot cabin 76 is provided in the centre, which can be adjusted vertically by means of a lift.

The described aerospacecraft can take off vertically from ground as well as from water and the same applies for touch-down.

Gyroscopes 10 respectively 52 maintain the craft in its various flight attitudes.

The discus shaped body exhibits a form which is aerodynamically of advantage, as the air resistance can be kept low even at high speeds. While there is shown and described present preferred embodiments of the invention, it is to be distinctly understood that the invention is not limited thereto but may be otherwise variously embodied and practiced within the scope of the following claims.

Accordingly, I claim:

1. An aerospacecraft comprising a substantially discus-shaped body, a number of disc-type air screws provided for said body, a number of turbines and a number of jet engines provided for said body, one respective turbine and jet engine being operatively associated with a respective disc-type air screw, each of said disc-type air screws being driven by the associated turbine by means of exhaust gases emanating from the associated jet engine, each of said disc-type air screws being equipped with variable pitch blades and functioning in the manner of a helicopter rotor for the generation of lift, each turbine having vanes driven by the exhaust gases generated by the associated jet engine, and said number of jet engines being symmetrically arranged along diagonals extending across the craft, two of said number of jet engines defining rear engines, means for rotating said two rear jet engines through 180° in a plane extending through the center of the body, and each jet engine driving the associated disc-type air screw.

2. An aerospacecraft comprising a substantially discus-shaped body, a number of disc-type air screws provided for said body, a number of turbines and a number of jet engines provided for said body, one respective turbine and jet engine being operatively associated with a respective disc-type air screw, each of said disc-type air screws being driven by the associated turbine by means of exhaust gases emanating from the associated jet engine, each of said disc-type air screws being equipped with variable pitch blades and functioning in the manner of a helicopter rotor for the generation of lift, each turbine having vanes driven by the exhaust gases generated by the associated jet engine, duct means for said disc-shaped body for directing the exhaust gases of each jet engine against the vanes of the associated disc-type air screw, said duct means merging with exhaust pipe means inclined through an angle of about 45° with respect to the central plane of the body to permit downward deflection of the exhaust gases from each jet engine, said number of jet engines comprising four jet engines substantially symmetrically arranged along diagonals extending across the craft, two of said jet engines defining rear engines, means for rotating said two rear jet engines through approximately 180° in a plane extending through the center of the body, each jet engine driving an associated disc-type air screw, and means for interrupting the connection of the duct means of the jet engines with the exhaust pipe means in order to be reconnected with air ducts when both rear jet engines are positioned such that the thrust of all four jet engines is in the same direction.

* * * * *